US009830462B2

United States Patent
Luo et al.

(10) Patent No.: US 9,830,462 B2
(45) Date of Patent: Nov. 28, 2017

(54) INDUSTRIAL SECURITY AGENT PLATFORM

(71) Applicant: Accenture Global Services Limited, Dublin (IE)

(72) Inventors: Song Luo, Gaithersburg, MD (US); Walid Negm, Reston, VA (US); James J. Solderitsch, Rosemont, PA (US); Shaan Mulchandani, Arlington, VA (US); Amin Hassanzadeh, Arlington, VA (US); Shimon Modi, Washington, DC (US)

(73) Assignee: Accenture Global Services Limited, Dublin (IE)

( * ) Notice: Subject to any disclaimer, the term of this patent is extended or adjusted under 35 U.S.C. 154(b) by 103 days.

(21) Appl. No.: 14/839,331

(22) Filed: Aug. 28, 2015

(65) Prior Publication Data

US 2016/0085972 A1    Mar. 24, 2016

Related U.S. Application Data

(60) Provisional application No. 62/054,181, filed on Sep. 23, 2014.

(51) Int. Cl.
*H04L 29/06* (2006.01)
*G06F 21/60* (2013.01)
*H04L 9/08* (2006.01)

(52) U.S. Cl.
CPC .......... *G06F 21/602* (2013.01); *H04L 9/0894* (2013.01); *H04L 63/0209* (2013.01);
(Continued)

(58) Field of Classification Search
CPC . G06F 21/602; H04L 9/0894; H04L 63/0209; H04L 63/20; H04L 63/10; H04L 63/08; H04L 2209/76
See application file for complete search history.

(56) References Cited

U.S. PATENT DOCUMENTS 6,233,626 B1 *  5/2001  Swales ............... G05B 19/4185
                                                    710/11
6,618,394 B1 *  9/2003  Hilleary ................. H04L 29/06
                                                    370/464

(Continued)

OTHER PUBLICATIONS

Extended European Search Report in Application No. 15186506.0, dated Jan. 29, 2016, 7 pages.

*Primary Examiner* — David Garcia Cervetti
(74) *Attorney, Agent, or Firm* — Fish & Richardson P.C.

(57) ABSTRACT

Systems, methods, and apparatus, including computer programs encoded on computer storage media, for facilitating communication in an industrial control network. A system includes an industrial control network, one or more controller devices, one or more emulators, and an encryption relay processor. Each controller device can be operable to control one or more operational devices connected to the industrial control network. Each emulator can be configured to communicate with a respective controller device, and each emulator can be configured to reference a respective profile that includes information about security capabilities of the respective controller device. The encryption relay processor can be operable to facilitate communication to and from each emulator over the industrial control network. The encryption relay processor can execute a cryptographic function for a communication between the emulator and a node on the industrial control network when the respective controller device is incapable of performing the cryptographic function.

20 Claims, 7 Drawing Sheets

(52) U.S. Cl.
CPC .............. *H04L 63/08* (2013.01); *H04L 63/10* (2013.01); *H04L 63/20* (2013.01); *H04L 2209/76* (2013.01)

(56) References Cited

U.S. PATENT DOCUMENTS

| | | | | |
|---|---|---|---|---|
| 6,751,562 | B1* | 6/2004 | Blackett | G05B 19/4185 340/635 |
| 7,533,331 | B2* | 5/2009 | Brown | H04L 1/0083 713/176 |
| 7,587,481 | B1* | 9/2009 | Osburn, III | G05B 19/4183 709/203 |
| 7,587,595 | B2* | 9/2009 | Scarlata | G06F 21/53 713/167 |
| 7,673,337 | B1* | 3/2010 | Osburn, III | G06F 21/572 380/282 |
| 8,015,393 | B2* | 9/2011 | Fukasawa | H04L 9/0891 380/277 |
| 8,051,156 | B1* | 11/2011 | Sharma | G06F 9/5094 700/276 |
| 8,064,412 | B2* | 11/2011 | Petite | H04L 12/2825 340/540 |
| 8,176,532 | B1* | 5/2012 | Cook | H04L 63/10 726/11 |
| 8,219,214 | B1* | 7/2012 | Mimlitz | G05B 15/02 340/3.1 |
| 8,301,386 | B1* | 10/2012 | Redmond | G05B 19/408 702/16 |
| 8,335,304 | B2* | 12/2012 | Petite | G06Q 20/02 379/143 |
| 8,402,267 | B1* | 3/2013 | Graham | G06F 21/53 713/164 |
| 8,448,238 | B1* | 5/2013 | Gupta | H04L 63/08 726/15 |
| 8,966,117 | B1* | 2/2015 | Osburn, III | H04L 43/0864 702/188 |
| 8,996,917 | B1* | 3/2015 | Chandramohan | G06F 11/3696 714/26 |
| 9,015,337 | B2* | 4/2015 | Hemed | H04L 43/50 370/251 |
| 9,049,025 | B1* | 6/2015 | Huang | H04L 9/32 |
| 9,100,318 | B1* | 8/2015 | Osburn, III | H04L 45/26 |
| 9,129,497 | B2* | 9/2015 | Petite | G01V 1/364 |
| 9,137,222 | B2* | 9/2015 | Haeger | H04L 63/061 |
| 9,185,088 | B1* | 11/2015 | Bowen | H04L 63/0464 |
| 9,276,740 | B2* | 3/2016 | Nix | H04W 52/0235 |
| 9,419,979 | B2* | 8/2016 | Sharma | H04L 63/10 |
| 9,426,135 | B2* | 8/2016 | Sharma | H04L 63/08 |
| 9,426,136 | B2* | 8/2016 | Sharma | H04L 63/08 |
| 9,426,148 | B2* | 8/2016 | Sharma | H04L 63/083 |
| 2001/0047471 | A1* | 11/2001 | Johnson | G06F 9/4411 713/1 |
| 2002/0193888 | A1* | 12/2002 | Wewalaarachchi | G05B 15/02 700/9 |
| 2003/0204756 | A1* | 10/2003 | Ransom | G01D 4/004 713/300 |
| 2003/0233573 | A1* | 12/2003 | Phinney | G06F 21/606 726/14 |
| 2004/0107025 | A1* | 6/2004 | Ransom | G05B 19/4185 700/286 |
| 2004/0139052 | A1* | 7/2004 | Kazushige | H04L 29/06 |
| 2004/0156352 | A1* | 8/2004 | Freeman | H04Q 9/00 370/351 |
| 2005/0005093 | A1* | 1/2005 | Bartels | G06F 21/606 713/150 |
| 2005/0055578 | A1* | 3/2005 | Wright | G06F 21/32 726/4 |
| 2005/0149631 | A1* | 7/2005 | Decker | H04L 1/0061 709/230 |
| 2005/0182979 | A1* | 8/2005 | Gross | G06F 9/4443 713/300 |
| 2005/0246112 | A1* | 11/2005 | Abhulimen | F17D 5/02 702/51 |
| 2005/0256964 | A1* | 11/2005 | Dube | H04L 67/02 709/230 |
| 2006/0067209 | A1* | 3/2006 | Sheehan | H04L 29/08846 370/216 |
| 2006/0101111 | A1* | 5/2006 | Bouse | H04L 12/40 709/200 |
| 2006/0117295 | A1* | 6/2006 | Wu | G05B 19/00 717/104 |
| 2006/0123208 | A1* | 6/2006 | Johnson | G06F 11/1456 711/162 |
| 2006/0174347 | A1* | 8/2006 | Davydov | G06F 21/10 726/26 |
| 2006/0240818 | A1* | 10/2006 | McCoy | H04B 7/18567 455/430 |
| 2006/0247911 | A1* | 11/2006 | Nieuwsma | H04L 67/08 703/27 |
| 2007/0018851 | A1* | 1/2007 | Ocondi | G08C 17/02 340/870.11 |
| 2007/0067458 | A1* | 3/2007 | Chand | G06F 17/30569 709/226 |
| 2007/0113078 | A1* | 5/2007 | Witt | G06F 21/602 713/165 |
| 2007/0136501 | A1* | 6/2007 | Chang | G06F 13/4291 710/105 |
| 2007/0157294 | A1* | 7/2007 | Johnson | G06F 3/0605 726/4 |
| 2007/0162957 | A1* | 7/2007 | Bartels | G05B 15/02 726/2 |
| 2007/0168668 | A1* | 7/2007 | Chang | G06F 21/572 713/176 |
| 2007/0199061 | A1* | 8/2007 | Byres | H04L 41/0806 726/11 |
| 2008/0037786 | A1* | 2/2008 | Park | H04L 63/0892 380/270 |
| 2008/0046566 | A1* | 2/2008 | Tiwari | H04K 3/43 709/225 |
| 2008/0101251 | A1* | 5/2008 | Casebolt | H04L 12/24 370/252 |
| 2008/0103631 | A1* | 5/2008 | Koliwad | H04Q 9/00 700/286 |
| 2008/0109889 | A1* | 5/2008 | Bartels | H04L 63/10 726/7 |
| 2008/0208368 | A1* | 8/2008 | Grgic | G05B 19/042 700/20 |
| 2008/0240105 | A1* | 10/2008 | Abdallah | H04L 12/66 370/392 |
| 2008/0274689 | A1* | 11/2008 | Kuban | H04L 1/16 455/7 |
| 2008/0313254 | A1* | 12/2008 | Hilemon | G05B 19/4185 709/200 |
| 2008/0316048 | A1* | 12/2008 | Abdallah | G01V 11/002 340/854.6 |
| 2009/0070447 | A1* | 3/2009 | Jubinville | G06F 1/28 709/223 |
| 2009/0106551 | A1* | 4/2009 | Boren | H04L 9/0822 713/158 |
| 2009/0141896 | A1* | 6/2009 | McCown | G06Q 20/3223 380/255 |
| 2009/0222885 | A1* | 9/2009 | Batke | H04L 63/061 726/1 |
| 2009/0254224 | A1* | 10/2009 | Rasmussen | G05B 15/02 700/287 |
| 2009/0254655 | A1* | 10/2009 | Kidwell | H04L 41/0226 709/224 |
| 2009/0265720 | A1* | 10/2009 | Nagampalli | G06F 13/102 719/321 |
| 2009/0281779 | A1* | 11/2009 | Kajitani | G05B 17/02 703/7 |
| 2009/0306952 | A1* | 12/2009 | Kajitani | G06F 17/5022 703/13 |
| 2009/0327483 | A1* | 12/2009 | Thompson | G06F 17/30067 709/224 |
| 2010/0002879 | A1* | 1/2010 | Risley | H04L 63/0428 380/255 |
| 2010/0020724 | A1* | 1/2010 | Wimmer | H02H 1/0061 370/254 |

(56) References Cited

U.S. PATENT DOCUMENTS

| | | | |
|---|---|---|---|
| 2010/0067698 A1* | 3/2010 | Hahn | H04L 9/3242 380/270 |
| 2010/0142707 A1* | 6/2010 | Han | H04L 63/0428 380/255 |
| 2010/0183150 A1* | 7/2010 | Lee | H04L 9/0822 380/255 |
| 2010/0204948 A1* | 8/2010 | Kirrmann | G01R 31/3272 702/117 |
| 2010/0251269 A1* | 9/2010 | Remmert | G06F 9/545 719/328 |
| 2010/0256832 A1* | 10/2010 | Kirrmann | H02H 7/261 700/293 |
| 2010/0290476 A1* | 11/2010 | Brindle | H04L 45/00 370/401 |
| 2010/0324845 A1* | 12/2010 | Spanier | G01R 19/2513 702/62 |
| 2010/0332479 A1* | 12/2010 | Prahlad | G06F 17/3002 707/741 |
| 2011/0040809 A1* | 2/2011 | Spanier | G01D 4/004 707/821 |
| 2011/0093639 A1* | 4/2011 | Richards | H04L 12/40032 710/310 |
| 2011/0153969 A1* | 6/2011 | Petrick | G06F 21/606 711/163 |
| 2011/0158405 A1* | 6/2011 | Choi | H04L 9/0836 380/44 |
| 2011/0208849 A1* | 8/2011 | Barnett | H04L 63/1433 709/223 |
| 2011/0249816 A1* | 10/2011 | Choi | H04L 9/0836 380/279 |
| 2011/0307114 A1* | 12/2011 | Kunsman | G06F 15/167 700/292 |
| 2012/0005326 A1* | 1/2012 | Bradetich | G05B 19/4185 709/223 |
| 2012/0008767 A1* | 1/2012 | Smith | H04L 9/0631 380/28 |
| 2012/0056711 A1* | 3/2012 | Hanrahan | G05B 9/02 340/3.4 |
| 2012/0076293 A1* | 3/2012 | Smith | H04L 9/0637 380/28 |
| 2012/0078422 A1* | 3/2012 | Mejias | H05K 7/20836 700/277 |
| 2012/0144187 A1* | 6/2012 | Wei | H04L 63/0281 713/152 |
| 2012/0194351 A1* | 8/2012 | Floyd | G05B 17/02 340/853.1 |
| 2012/0196594 A1* | 8/2012 | Abhishek | H04L 12/1836 455/435.1 |
| 2012/0233296 A1* | 9/2012 | Wimmer | H02J 13/0086 709/220 |
| 2012/0266209 A1* | 10/2012 | Gooding | H04L 63/20 726/1 |
| 2012/0331082 A1* | 12/2012 | Smith | H04L 49/602 709/208 |
| 2013/0031201 A1* | 1/2013 | Kagan | G01D 4/004 709/213 |
| 2013/0051238 A1* | 2/2013 | Maria | H04W 24/10 370/241 |
| 2013/0064229 A1* | 3/2013 | Gidlund | H04W 28/065 370/336 |
| 2013/0081103 A1* | 3/2013 | Uner | G06F 21/577 726/1 |
| 2013/0151220 A1* | 6/2013 | Matsumura | G06F 17/5009 703/7 |
| 2013/0151849 A1* | 6/2013 | Graham | H04L 9/32 713/164 |
| 2013/0159724 A1* | 6/2013 | Kim | H04L 9/0844 713/181 |
| 2013/0212420 A1* | 8/2013 | Lawson | G05B 19/4185 713/400 |
| 2013/0212669 A1* | 8/2013 | Wilson | H04L 63/1416 726/12 |
| 2013/0338800 A1* | 12/2013 | Patri | G05B 13/02 700/28 |
| 2014/0068712 A1* | 3/2014 | Frenkel | H04L 63/126 726/3 |
| 2014/0109182 A1* | 4/2014 | Smith | H04L 63/1416 726/3 |
| 2014/0115335 A1* | 4/2014 | Jorden | G07C 5/008 713/169 |
| 2014/0165182 A1* | 6/2014 | Curry | H04L 63/0281 726/12 |
| 2014/0181891 A1* | 6/2014 | Von Bokern | H04L 63/20 726/1 |
| 2014/0195844 A1* | 7/2014 | Laval | G06F 11/3062 713/340 |
| 2014/0201321 A1* | 7/2014 | Donaghey | H04L 67/2823 709/217 |
| 2014/0277801 A1* | 9/2014 | Cioraca | H04W 12/06 700/292 |
| 2014/0371941 A1* | 12/2014 | Keller | H02J 13/0006 700/297 |
| 2015/0007275 A1* | 1/2015 | Hilbert | G06F 21/70 726/4 |
| 2015/0055508 A1* | 2/2015 | Ashida | H04L 45/00 370/254 |
| 2015/0089646 A1* | 3/2015 | Jeon | H04L 63/1475 726/23 |
| 2015/0095711 A1* | 4/2015 | Elend | G06F 11/221 714/39 |
| 2015/0097697 A1* | 4/2015 | Laval | H04L 69/03 340/870.02 |
| 2015/0205966 A1* | 7/2015 | Chowdhury | G06F 21/577 726/23 |
| 2015/0215279 A1* | 7/2015 | Fischer | H04L 63/02 726/11 |
| 2015/0215283 A1* | 7/2015 | Fischer | H04L 63/02 726/14 |
| 2015/0350895 A1* | 12/2015 | Brander | H04L 51/04 455/411 |
| 2015/0372994 A1* | 12/2015 | Stuntebeck | H04L 63/0464 713/156 |
| 2015/0381642 A1* | 12/2015 | Kim | H04L 41/00 726/23 |
| 2016/0373274 A1* | 12/2016 | Sivanthi | H04L 12/4625 |
| 2017/0177865 A1* | 6/2017 | Chowdhury | G06F 21/56 |

* cited by examiner

INDUSTRIAL SECURITY AGENT PLATFORM

CROSS-REFERENCE TO RELATED APPLICATIONS

This application claims benefit of U.S. Provisional Patent Application No. 62/054,181, filed Sep. 23, 2014, and titled "INDUSTRIAL SECURITY AGENT PLATFORM," which is hereby incorporated by reference in its entirety.

BACKGROUND

The present disclosure relates to security and network operations.

Operational technology networks associated with industrial control systems generally use proprietary technology and are generally isolated. However, operational technology networks and controller devices within the networks can be connected with other networks (e.g., enterprise networks), raising the possibility of network attacks to operational technology networks and/or controller devices in an industrial control system. Insider attacks may be launched by authorized users in an enterprise network or operational technology network control zone, whereas outsider attacks may be launched by attackers who are not authorized users. Properties targeted by an attacker may generally include control (e.g., timeliness) and security (e.g., availability, integrity, confidentiality) properties.

SUMMARY

In general, one innovative aspect of the subject matter described in this specification can be embodied in systems including an industrial control network, one or more controller devices, one or more emulators, and an encryption relay processor. Each controller device can be operable to control one or more operational devices connected to the industrial control network. Each emulator can be configured to communicate with a respective controller device, and each emulator can be configured to reference a respective profile that includes information about security capabilities of the respective controller device. The encryption relay processor can be operable to facilitate communication to and from each emulator over the industrial control network. The encryption relay processor can execute a cryptographic function for a communication between the emulator and a node on the industrial control network when the respective controller device is incapable of performing the cryptographic function.

This and other embodiments may each optionally include one or more of the following features. For instance, a security server can be included, operable to maintain the respective profile for the respective controller device and to implement the emulator. The security server can be operable to reference specification information for the respective controller device and to generate the profile based on the specification information. The security server can be operable to create the emulator based on its respective profile. The security server and the encryption relay processor can each be operable to maintain a list of controller devices that are incapable of performing the cryptographic function. The security server and the encryption relay processor can each be operable to maintain a shared encryption key and to perform key negotiation protocols. The communication can be encrypted or decrypted using the shared encryption key. The encryption relay processor may not execute the cryptographic function for the communication between the emulator and the node on the industrial control network when the respective controller device is capable of performing the cryptographic function. A firewall can be included between the one or more emulators and the encryption relay processor.

In general, another innovative aspect of the subject matter described in this specification can be embodied in methods for facilitating communication in an industrial control network, including receiving, from a site security server, an encrypted query for a controller device; determining that the controller device is incapable of performing a cryptographic operation; after determining that the controller device is incapable of performing a cryptographic operation, decrypting the query for the controller device and providing the decrypted query to the controller device; in response to receiving an unencrypted query response from the controller device, encrypting the query response; and providing the encrypted query response to the site security server.

This and other embodiments may each optionally include one or more of the following features. For instance, specification information for the controller device can be referenced and a profile for the controller device can be generated that includes information about its security capabilities, based on the specification information. An emulator for the controller device can be created based on the profile for the controller device. The emulator can handle cryptographic operations for its corresponding controller device. Determining that the controller device is incapable of performing the cryptographic operation can include referencing the profile for the controller device. A list of controller devices that are incapable of performing the cryptographic operation can be maintained. Determining that the controller device is incapable of performing the cryptographic operation can include referencing the list. The encrypted query for the controller device can be received from the site security server through a firewall, and the encrypted query response can be provided to the site security server through the firewall.

Other embodiments of these aspects include corresponding computer methods, and include corresponding apparatus and computer programs recorded on one or more computer storage devices, configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification may be implemented so as to realize one or more of the following advantages. Assets of an industrial control system can be protected in a connected networking environment, such as an operational technology network connected to an enterprise network and/or the Internet. Device emulators can be created for protecting controller devices from security threats, based on company guidelines—thus, customized security policies can be implemented for particular environments. Emulators can be customized for particular devices that are to be accessed from outside of the operational technology network, based on device capabilities. Security for an industrial control system can be implemented without interrupting operation of an operational technology network, and without installing software or software patches on controller devices to be protected. Security controls for emulated controller devices can be managed flexibly—obsolete controls can be removed and new controls can be added. Information from multiple controller devices and/or from multiple operational technology networks can be aggregated and accessed at a single terminal. Centralized control and configuration can be provided for multiple controller devices and/or multiple operational technology networks.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems, methods, and computer programs for providing an industrial security agent platform. Information technology networks (e.g., enterprise technology networks) may be connected with operational technology networks and/or the Internet to facilitate access, efficiency, and situational awareness. However, connecting information technology networks with operational technology networks may bring security risks to either or both networks. In general, controller devices (e.g., programmable logic controllers) may be used to send, receive, and/or process data from sensors, and may be used to control physical hardware devices such as valves and actuators in an industrial control system. Some controller devices that operate within an industrial control system may be manufactured without cybersecurity features and may not be updated or replaced due to operational issues. When connected to an information technology network or the Internet, for example, such controller devices may be vulnerable to unauthorized access and/or security attacks.

An industrial security agent platform may be provided for protecting assets in an industrial control system in a connected networking environment. To protect assets in an operational technology network, for example, a virtual security entity (e.g., an emulated device) may be created and maintained for each controller device. Device emulators, for example, may handle network communications to and from their associated controller devices, and may provide a secure representation of the controller devices to a network. In general, the industrial security agent platform can implement cyber security controls, such as authentication and encryption, on a device emulator. Communications between a controller device and a network may be handled by the device emulator, for example, subject to implemented security controls (e.g. access, encryption, and/or decryption) for the particular device.

Figure 1:
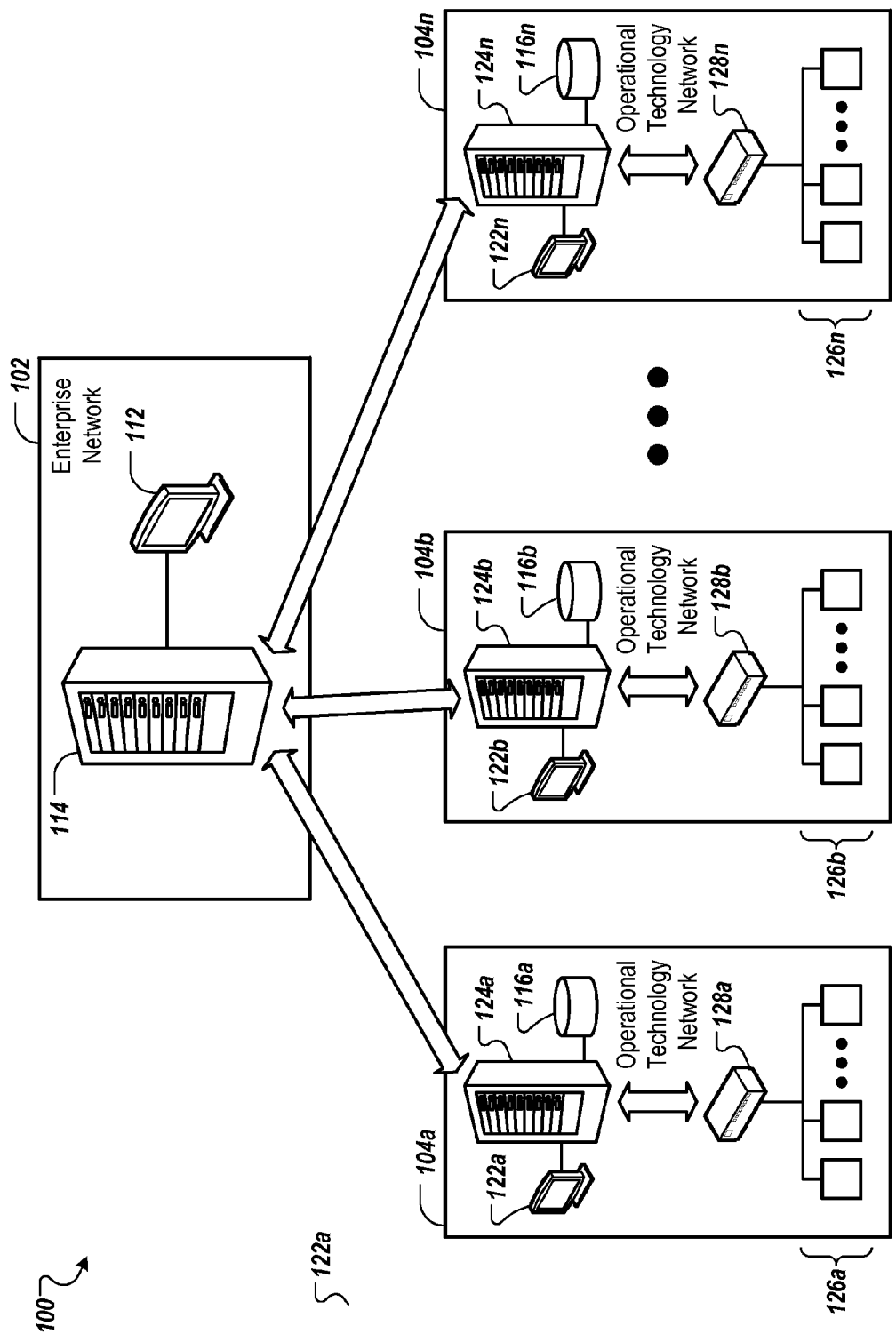
FIGS. 1-5 depict example systems that can execute implementations of the present disclosure.

FIG. 1 depicts an example system 100 that can execute implementations of the present disclosure. In the present example, the system 100 includes an enterprise network 102 that can communicate with one or more operational technology networks (e.g., networks 104a, 104b, and 104n). The enterprise network 102, for example, can connect various computers and related devices, can facilitate data sharing, and can facilitate system and device interoperability between different devices, operating systems, and communications protocols. Local and/or wide area networks may be included in the enterprise network 102, for example. Each of the operational technology networks 104a, 104b, and 104n, for example, can include interconnected computing devices to monitor and control physical equipment, such as equipment in an industrial site environment.

The enterprise network 102 can include a management server 114 and one or more associated input/output devices (e.g., an interface device 112). The management server 114, for example, can include one or more processors configured to execute instructions stored by computer-readable media for performing various operations, such as input/output, communication, data processing and/or data maintenance. For example, the management server 114 can perform tasks such as inventory and status monitoring for various site security servers (e.g., site security servers 124a, 124b, and 124n), where each site security server is configured to provide security services (e.g., authentication, cryptographic capabilities) for a respective operational technology network (e.g., networks 104a, 104b, and 104n). Each of the site security servers 124a, 124b, and 124n, for example, can provide configuration data to controller devices included in each of the operational technology networks 104a, 104b, and 104n, and can implement an aggregate view of information from the networks. To interact with the management server 114, for example, a user can employ the interface device 112 (e.g., including one or more presentation components such as a display, and one or more input components such as a keyboard, mouse, and/or touchpad).

Each of the operational technology networks 104a, 104b, and 104n can include a respective site security server 124a, 124b, and 124n and one or more associated input/output devices (e.g., interface devices 122a, 122b, and 122n). Each of the site security servers 124a, 124b, and 124n, for example, can include one or more processors configured to execute instructions stored by computer-readable media for performing various operations, such as input/output, communication, data processing and/or data maintenance. For example, the site security server 124a can provide security functions for one or more controller devices 126a in the operational technology network 104a, the site security server 124b can provide security functions for one or more controller devices 126b in the operational technology network 104b, and the site security server 124n can provide security functions for one or more controller devices 126n in the operational technology network 104n. To interact with each of the respective security servers 124a, 124b, and 124n, for example, a user can employ the respective associated interface device 122a, 122b, or 122n (e.g., including one or more presentation components such as a display, and one or more input components such as a keyboard, mouse, and/or touchpad).

In some implementations, a site security server may provide (or provide access to) various site management and facility tools. For example, each of the site security servers 124a, 124b, and 124n can include software tools to locate existing controller devices in an operational technology network. To locate controller devices, for example, network-based techniques may be used to explore a network, or a device information data store (e.g., device information store 116a, 116b, or 116n) may be accessed. As another example, each of the site security servers 124a, 124b, and 124n can include software tools to orchestrate its security controls with security controls provided by other devices (e.g., firewalls and site security servers). As another example, each of the site security servers 124a, 124b, and 124n can include software tools to enable or disable remote access to particular controller devices and/or particular operational technology networks.

In some implementations, each site security server may be in communication with a respective security relay server. For example, the site security server 124a can communicate with a security relay server 128a, the site security server 124b can communicate with a security relay server 128b, and the site security server 124n can communicate with a security relay server 128n. Each of the security relay servers 128a, 128b, and 128n, for example, can perform various security functions, such as encrypting and decrypting packets to and from respective controller devices 126a, 126b, and 126n that are incapable of performing cryptographic operations, such that data communication between each of the site security servers 124a, 124b, and 124n, and the respective controller devices 126a, 126b, and 126n are encrypted. In some implementations, a site security server may be deployed in a different network than its respective security relay server. For example, each site security server 124a, 124b, and 124n may be deployed in a peripheral network (e.g., a DMZ network), whereas each security relay server 128a, 128b, and 128n may be deployed its respective operational technology network 104a, 104b, and 104n.

Figure 2:
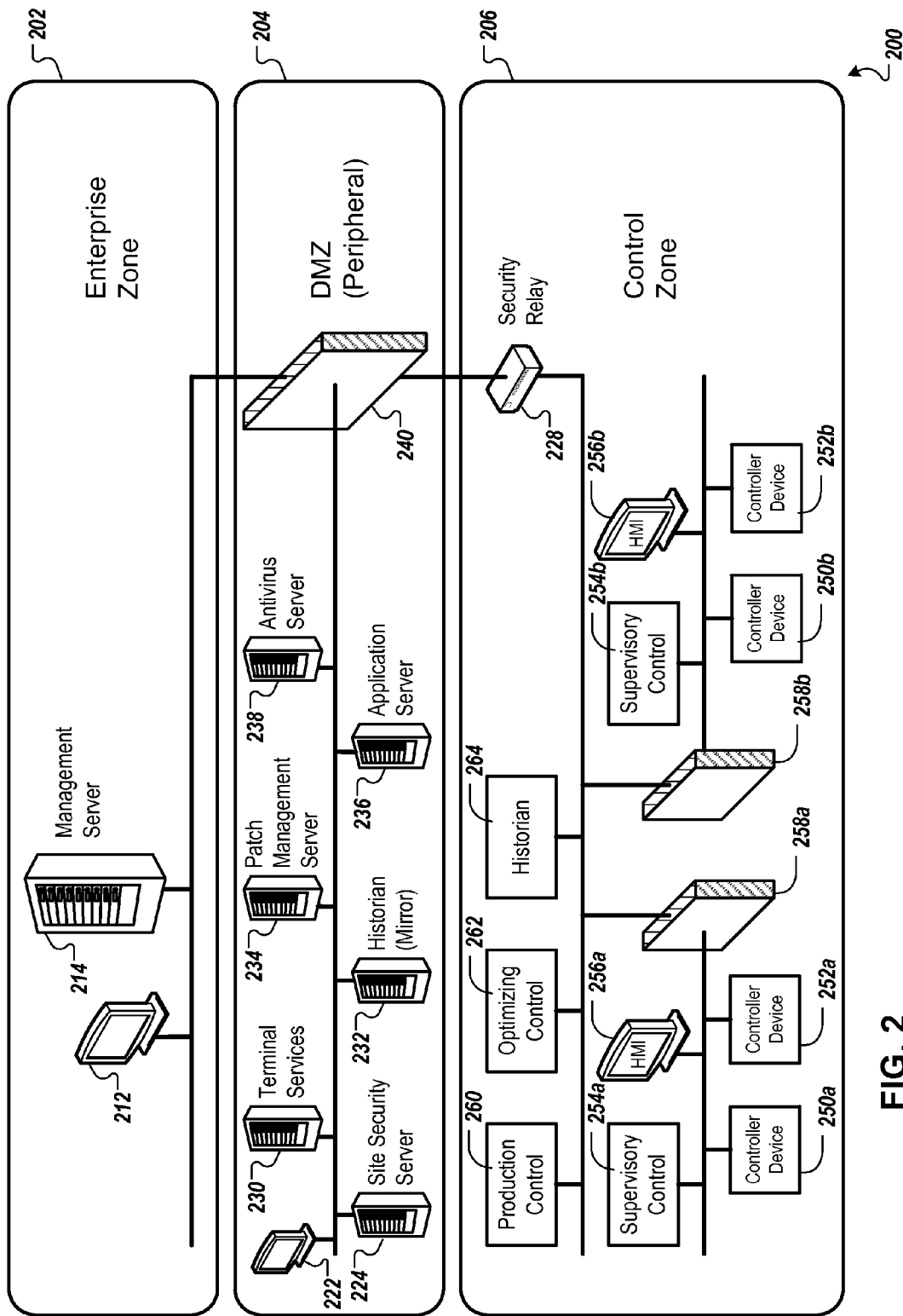

FIG. 2 depicts an example system 200 that can execute implementations of the present disclosure. In the present example, the system 200 includes multiple network zones, including an enterprise zone 202, a demilitarized zone (DMZ) 204 (which may also be referred to as a "peripheral network"), and a control zone 206. Each of the zones 202, 204, and 206, for example, can include one or more networks, which can connect various network nodes (e.g., computers and related devices). In general, communication between network nodes in the enterprise zone 202 and nodes in the control zone 206 may pass through the DMZ 204.

The enterprise zone 202, for example, can include an enterprise network, a site business planning network, a logistics network, and other suitable networks, such as the Internet. In the present example, the enterprise zone 202 includes a management server 214 (e.g., similar to the management server 114, shown in FIG. 1), and one or more associated input/output devices (e.g., an interface device 212, similar to the interface device 112, shown in FIG. 1).

In general, the management server 214 may be used to manage operational technology networks for various industrial sites, and to provide information related to each of the networks. The management server 214, for example, can perform functions such as lifecycle management (e.g., providing deployment, configuration, status monitoring, updates, termination, etc.) for various site security servers, can provide an aggregate view of information (e.g., network and/or device statuses) from various site security servers and operational technology networks, and can provide secure communications to and from site security servers and operational technology networks. Providing secure communications between the management server 214 and a site security server 224 (e.g., similar to the site security servers 124a, 124b, and 124n, shown in FIG. 1), for example, may include providing strong cryptography algorithms and passwords, providing two-factor authentication, and/or other suitable security techniques. For example, communications between the management server 214 and the site security server 224 can be protected using a dedicated communication channel, and using firewall rules specifying that communications may occur through dedicated ports and addresses.

The DMZ 204 (or peripheral network) may be physically located outside of the enterprise zone 202 and the control zone 206, for example in a location in which authorized employees have access. In the present example, the DMZ 204 includes the site security server 224, and includes terminal services 230, a historian mirror 232, a patch management server 234, an application server 236, an antivirus server 238, and a firewall 240.

In general, the site security server 224 may be used to provide cyber security functions for an operational technology network, and for controller devices included in the operational technology network. Cyber security functions, for example, may include functions such as operational technology network security functions (e.g., group membership management, key and password management and distribution, group bootstrapping management, and network-level intrusion detection and prevention), device-level security functions (e.g., authentication, access control, secure communication, bootstrapping management, device-level patching, and device-level intrusion detection and prevention), and device security capability profiling. The site security server 224, for example, can handle secure communications between the management server 214 and an operational technology network in the control zone 206. When handling such communications, for example, the site security server 224 can perform group-level and device-level security functions. To interact with the site security server 224 and/or other devices included in the DMZ 204, for example, a user can employ an interface device 222 (e.g., including one or more presentation components such as a display, and one or more input components such as a keyboard, mouse, and or touchpad.)

In some implementations, network-based intrusion detection systems (NIDS) and/or host-based intrusion detection systems (HIDS) can be employed to detect attacks targeting control devices in the control zone 206 and nodes in the enterprise zone 202 and DMZ 204, and attacks targeting the site security server 224 itself. For example, signature-based and/or anomaly-based approaches may be used to detect an attack. In response to a detected attack, for example, an appropriate response may be performed.

Referring to other devices included in the DMZ 204, the terminal services 230, the historian mirror 232, the patch management server 234, the application server 236, and the antivirus server 238, for example, can each provide services and/or data to devices in the control zone 206. The terminal services 230, for example, can provide a remote interface to devices. The historian mirror 232, for example, can back up information related to various device factors (e.g., activity, status, configuration, etc.), and can provide an interface for presenting such information. The patch management server 234, for example, can store scheduling information and can facilitate device patching based on a schedule. The application server 236, for example, can host custom applications that may operate within the DMZ 204. The antivirus server 238, for example, can scan devices and/or network traffic for potential computer viruses.

The control zone 206, for example, may include one or more operational technology networks for controlling devices (e.g., sensors, valves, and actuators) at an industrial site such as a manufacturing facility. Since some controller devices in the control zone 206 may not be equipped with security modules, for example, clear text communication may occur unless remedial measures are employed. In the present example, the control zone 206 includes a security relay 228 (e.g., similar to the security relay servers 128a, 128b, and 128n, shown in FIG. 1) that can operate as a gateway to incoming and outgoing network traffic, and can perform security services (encrypting/decrypting messages, and other appropriate services) for messages exchanged between the site security server 224 and controller devices in the control zone 206 that are determined to require such services. In some implementations, key and password management and distribution functions may be performed by a security relay device. For example, the security relay 228 can manage keys and/or passwords used for encrypting/decrypting communications between the relay 228 and the site security server 224, and can distribute the keys and/or passwords to controller devices in the operational technology networks when appropriate (e.g., according to a schedule).

Referring to other components included in the control zone 206, for example, controller devices 250a, 252a, 250b, and 252b are included. Each of the controller devices 250a, 252a, 250b, and 252b, for example, can be a low-level controller, such as a batch control, discrete control, continuous control, or hybrid control. Supervisory controls 254a and 254b, for example, can each control multiple low-level controls. For example, supervisory control 254a can coordinate controller devices 250a and 252a, and supervisory control 254b can coordinate controller devices 250b and 252b. Each of the controller devices 250a, 252a, 250b, and 252b, and each of the supervisory controls 254a and 254b, for example, may be programmable logic controllers (PLCs). Human-machine interface (HMI) devices 256a and 256b, for example, can provide an interface to controller devices and supervisory controls in the control zone 206.

Referring to other components included in the control zone 206, for example, various high-level controls are included. In the present example, the control zone 206 includes a production control 260, an optimizing control 262, and a historian 264. The production control 260, for example, can be used to manage a production process, and the optimizing control 262 can be used to optimize the process. The historian 264, for example, can store, maintain, and provide information related to the production process and to activities performed by each controller device in the control zone 206. In some implementations, a portion of a control zone may be partitioned behind a firewall. In the present example, the high-level controls 260, 262, and 264 can be partitioned from different portions of the control zone 206 (e.g., portions including different supervisory controls and low-level controls) by the firewalls 258a and 258b.

Figure 3:
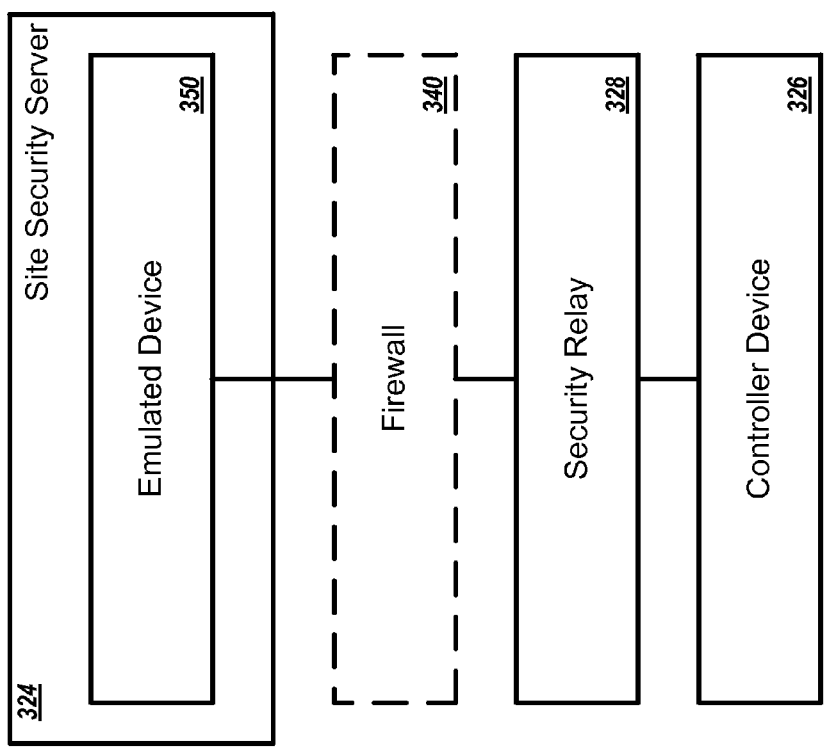

FIG. 3 depicts an example system 300 that can execute implementations of the present disclosure. In the present example, the system 300 includes a site security server 324 (e.g., similar to the site security server 224, shown in FIG. 2), connected to a security relay 328 (e.g., similar to the security relay 228, also shown in FIG. 2) through a firewall 340 (e.g., similar to the firewall 240, also shown in FIG. 2). The site security server 324, for example, can include one or more emulators (e.g., emulated device 350), each emulator configured to represent a corresponding controller device (e.g., controller device 326). In general, the site security server 324 may implement security capabilities (e.g., authentication, cryptographic capabilities, and other suitable security capabilities), and share the capabilities with the emulated device 350, which may perform security operations on behalf of the controller device 326.

Figure 4:
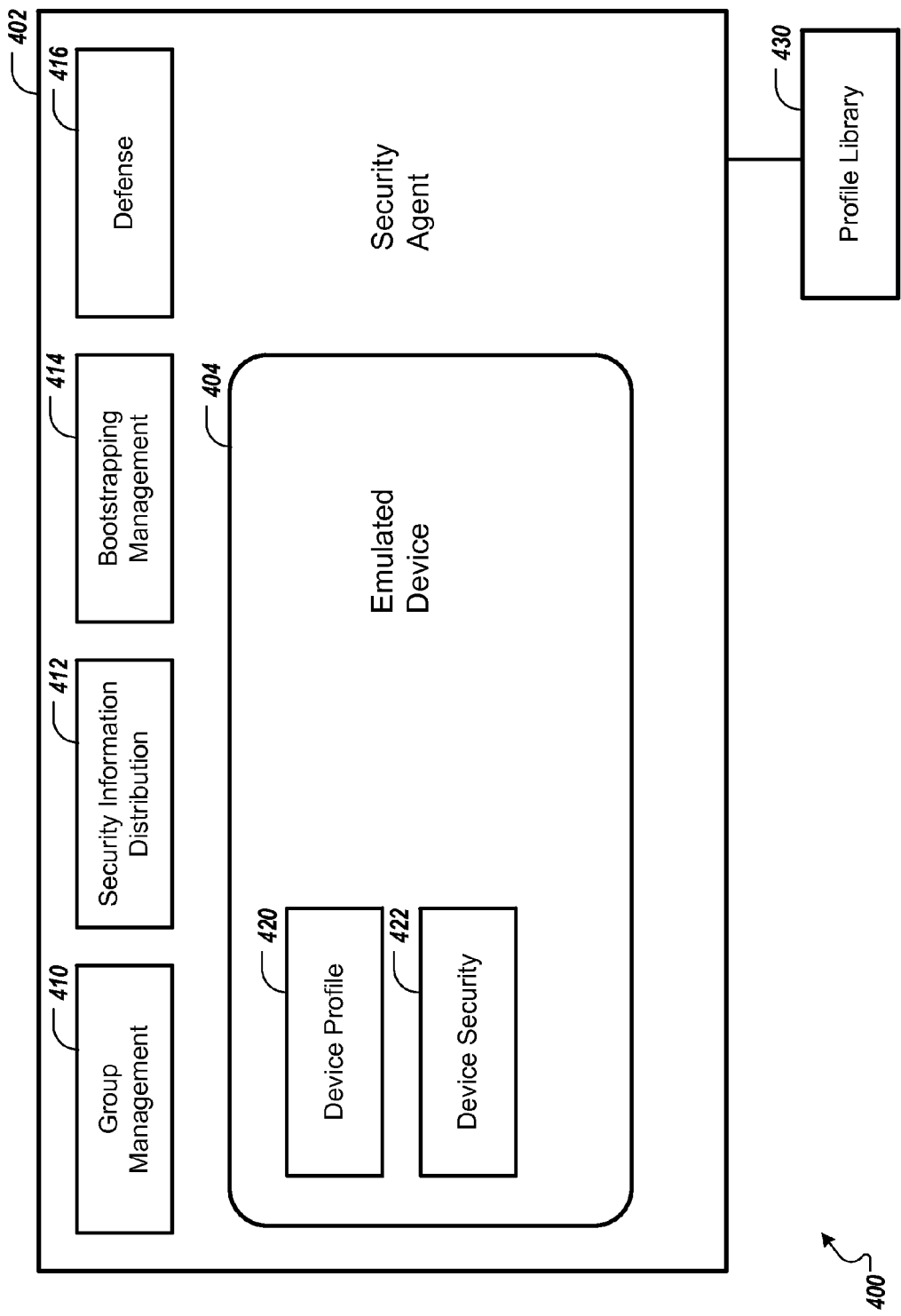

FIG. 4 depicts an example system 400 that can execute implementations of the present disclosure. In the present example, the system 400 includes a security agent 402 and an emulated device 404. The security agent 402, for example, can be a software component executed by a site security server (e.g., the site security server 124a, 124b, or 124n, shown in FIG. 1, the site security server 224, shown in FIG. 2, and the site security sever 324, shown in FIG. 3.). For each controller device in an operational technology network, for example, the security agent 402 can create a corresponding virtual security entity (e.g., the emulated device 404). In general, an emulated device may use security capabilities provided by its corresponding controller device (i.e., a real device) if such security capabilities are available, and may use security capabilities provided by the security agent 402 if such security capabilities are unavailable.

The security agent 402, for example, can include various components (e.g., software modules, objects, libraries, etc.) including a group management component 410, a security information distribution component 412, a bootstrapping management component 414, and a defense component 416. In general, the components 410, 412, 414, and 416 may relate to providing functionality for groups of devices and/or providing functionality at a network level. The group management component 410, for example, can be used to add or remove emulated devices from the security agent 402, and can provide access to device groups. The security information distribution component 412, for example, can be used to provide security information (e.g., keys and/or passwords) to devices or device groups. The bootstrapping management component 414, for example, can be used to provide initial configurations for controller devices when the devices boot up. The defense component 416, for example, can be used to provide intrusion detection based on network traffic.

The emulated device 404, for example, can include a device profile 420 and a device security component 422. The device profile 420, for example, can include information related to security capabilities that are provided by its corresponding controller device. The device security component 422, for example, can provide functions related to access control (e.g., providing access to users), authentication (e.g., validating passwords from authorized users, for human-to-device and device-to-device communication), bootstrapping management, host-based intrusion, device-specific content inspection (e.g., for analyzing packet content), software patching, and other aspects of cyber security.

In general, to create a device profile for an emulated device, various automated or semi-automated techniques may be employed. Referring to FIG. 3, for example, specifications for the controller device 326 can be imported and analyzed (e.g., by the site security server 324) to establish a security profile (e.g., device profile 420, shown in FIG. 4) to be used for the emulated device 350. Referring again to FIG. 4, for example, the device profile 420 can be used by the security agent 402 to generate the emulated device 404 (e.g., similar to the emulated device 350). Once created, for example, the device profile 420 may be added to a profile library 430 (e.g., a data store accessible by the security agent 402) for future reference.

In some implementations, penetration testing and/or network monitoring techniques may be used to create device profiles. For example, passive network monitoring techniques may be used to determine whether a particular controller device encrypts its network communications or does not encrypt its communications. As another example, penetration testing techniques may be used to attempt a connection with a controller device's network services, and a determination can be made of whether the controller device requests for user credentials or does not request for credentials. Such penetration testing and/or network monitoring techniques may be employed independently of accessing a device's specifications, for example, and may be automated using software security products.

Figure 5:
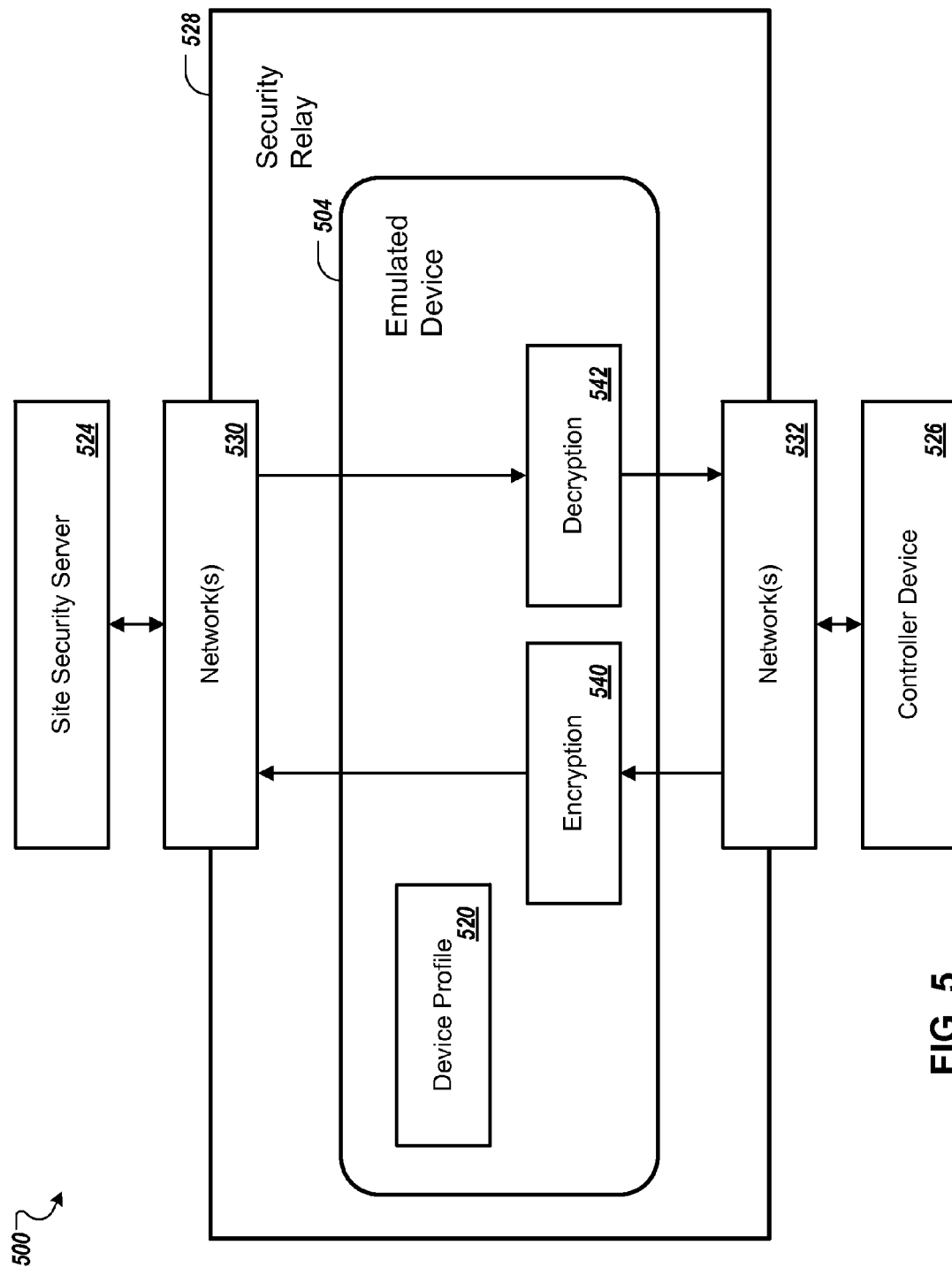

FIG. 5 depicts an example system 500 that can execute implementations of the present disclosure. In the present example, the system 500 includes a site security server 524 (e.g., similar to the site security server 124a, 124b, or 124n, shown in FIG. 1, the site security server 224, shown in FIG. 2, and the site security sever 324, shown in FIG. 3.), a security relay 528 (e.g., similar to the security relay server 128a, 128b, or 128n, shown in FIG. 1, the security relay 228, shown in FIG. 2, and the security relay 328, shown in FIG. 3), and a controller device 526 (e.g., a controller device in an operational technology network). The security relay 528 can include an emulated device 504 corresponding to the controller device 526, for example. The emulated device 504, for example, can be based on a device profile 520 that includes information related to security capabilities provided by the controller device 526. Communication between the site security server 524 and the security relay 528 can occur over one or more networks 530 (e.g., an Ethernet, a WiFi network, or another suitable network). Communication between the security relay 528 and the controller device 526 can occur over one or more networks 532 (e.g., an Ethernet, a WiFi network, or another suitable network).

In general, the security relay 528 may be implemented in hardware and/or software, and may be used to handle communications between the site security server 524 and the controller device 526, and may be used to provide security services (e.g., authentication and encryption/decryption) for controller devices which require such services. To provide security services, for example, the security relay 528 can access and/or execute one or more components (e.g., software modules, objects, libraries, etc.). For example, the emulated device 504 may be associated with an encryption component 540 and a decryption component 542. The encryption component 540, for example, can be used by the security relay 528 to encrypt traffic to the site security server 528 for a controller device without cryptographic capability (e.g., the controller device 526), whereas the decryption component 542, for example, can be used by the security relay 528 to decrypt traffic from the site security server 524 for the controller device.

In some implementations, corresponding emulated devices may be maintained by a site security server and a corresponding security relay for handling secure communications between the site security server and the security relay. For example, the site security server 524 and the security relay 528 can each maintain instances of the emulated device 504 corresponding to the controller device 526. As another example, the site security server 524 and the security relay 528 can each maintain lists of controller devices which require security services (e.g., encryption/decryption services). The site security server 524 and the security relay 528, for example, can use a shared cryptographic key, and can use key negotiation protocols to periodically change the shared key. When either the site security server 524 or the security relay 528 sends a message to the other on behalf of a controller device that requires security services (e.g., a device that is incapable of encryption/decryption), for example, the message may be encrypted using the shared key, whereas the message may not be encrypted when it is to be sent to a controller device that does not require security services (e.g., a device that is capable of encryption/decryption). After receiving a cleartext message from a controller device that is incapable of encryption/decryption, for example, the security relay 528 can encrypt the message with the shared key and send the encrypted message to the site security server 524. After receiving an encrypted message from the site security server 524 for a controller device that is incapable of encryption/decryption, for example, the security relay 528 can decrypt the message and send the cleartext message to the controller device.

Figure 6:
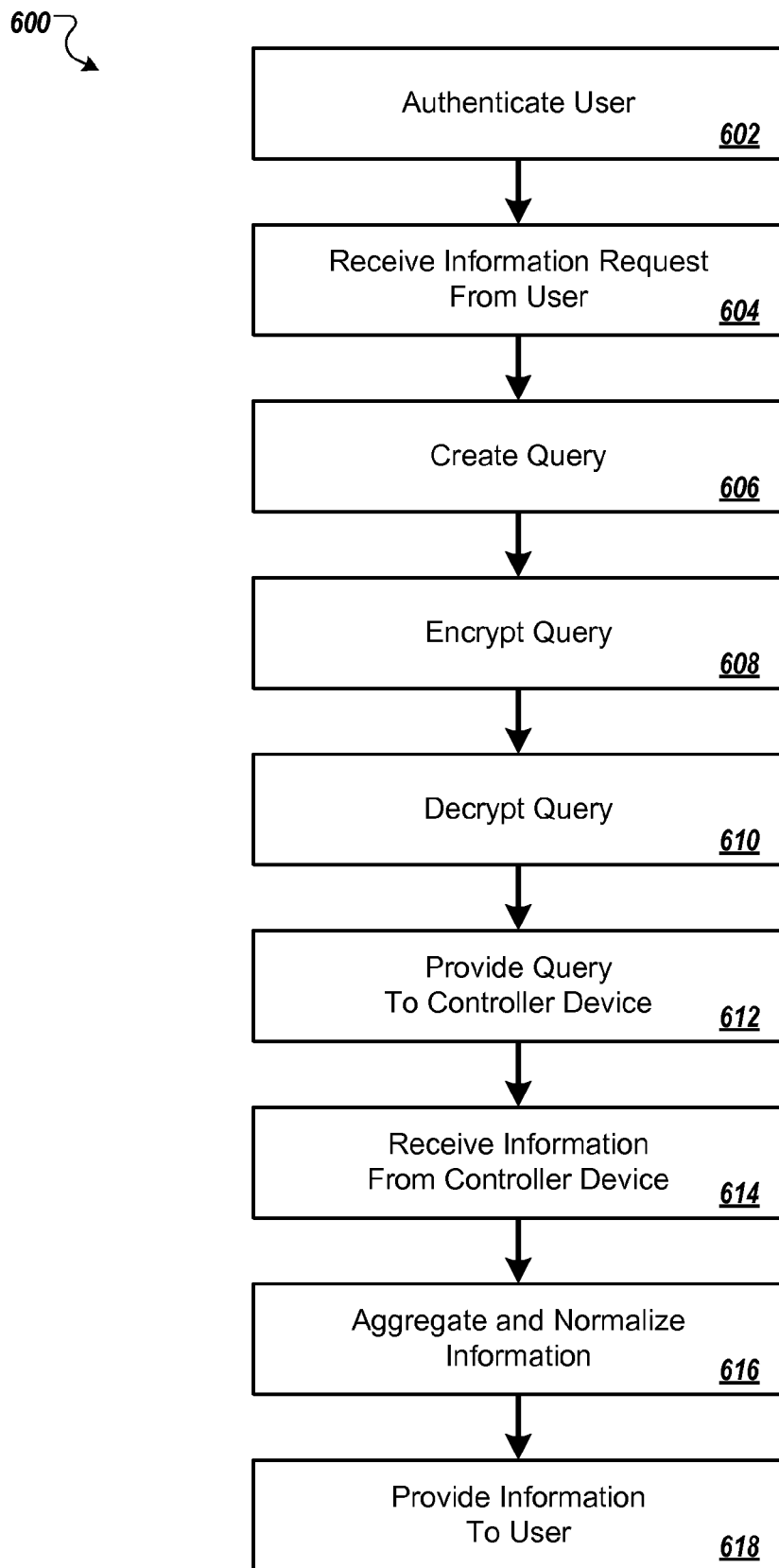
FIG. 6 depicts an example process that can be executed in accordance with implementations of the present disclosure.

FIG. 6 depicts an example process 600 that can be executed in accordance with implementations of the present disclosure. The process 600, for example, can be performed by systems such as one or more of the example systems described above (such as the site security server 224). Briefly, the example process 600 includes authenticating a user, receiving a request for information from the user, creating a query, encrypting the query, decrypting the query, providing the query to a controller device, receiving information from the controller device, aggregating and normalizing the information, and providing the information to the user.

A user can be authenticated (602). Referring to FIG. 2, for example, a user can employ the interface device 222 (e.g., employing a web browser interface) to access the site security server 224, which can authenticate the user and can present the user with information related to assets (e.g., operational technology networks and/or controller devices) that can be accessed by the user. In the present example, the user may be provided with access to devices in the control zone 206.

A request for information can be received from the user (604). For example, the user can employ the interface device 222 to request information about a particular controller device in the control zone 206, or may request information related to a group of devices. In the present example, the user requests information related to the production activity of a group of controller devices (e.g., the devices 250a and 252a) in the control zone 206. The request for information can be provided by the site security server 224 to the device(s) that pertain to the request. Communications between the site security server 224 and devices in the control zone 206 can pass through the firewall 240, for example.

A query corresponding to the request for information can be created (606). For example, the site security server 224 can parse the request for information received from the user, can sanitize the parsed request (e.g., to prevent restricted actions), and can translate the request into a query format that is recognizable by its intended recipient (e.g., each of the controller devices 250a and 252a). In general, sanitizing a request may include examining content associated with the request, determining that the request is of a valid format, and determining that parameters and payloads associated with the request are valid.

The query can be encrypted (608). Referring to FIG. 3, for example, the site security server 324 (e.g., similar to the site security server 224) can encrypt the query and can provide the encrypted query to the security relay 328 corresponding to a control zone (e.g., the control zone 206, shown in FIG. 2) that includes the query's intended recipient (e.g., the devices 250a and 252a, shown in FIG. 2). Communications between the site security server 324 and the security relay 328 can pass through the firewall 340 (e.g., similar to the firewall 240, shown in FIG. 2), for example.

The encrypted query may be decrypted (610), depending on whether its intended recipient requires security services.

Referring to FIG. 5, for example, the security relay 528 (e.g., similar to the security relay 328) can reference a device profile (e.g., device profile 520) for each of the query's intended recipients (e.g., the devices 250a and 252b, shown in FIG. 2), and can determine whether or not the recipient requires security services. In the present example, the security relay 528 may determine that the device 250a requires security services, whereas the device 252a is security capable. Thus, in the present example, the security relay 528 can use the decryption component 542 to decrypt the query for the device 250a.

The query can be provided to a controller device (612). Referring again to FIG. 2, for example, the security relay 228 (e.g., similar to the security relay 528) can provide the decrypted query to the controller device 250a (e.g., a security incapable device) and can provide the encrypted query to the controller device 252a (e.g., a security capable device). Each of the controller devices 250a and 252a, for example, can process the query and retrieve relevant information.

Information can be received from the controller device (614). For example, the security relay 228 may receive unencrypted information from the controller device 250a (e.g., a security incapable device) and may receive encrypted information from the controller device 252a (e.g., a security capable device). Referring to FIG. 5, for example, the security relay 528 can use the encryption component 540 to encrypt the information from the device 250a. Referring again to FIG. 2, for example, encrypted information from each of the controller devices 250a and 252a can be provided by the security relay 228 to the site security server 224 through the firewall 240.

The information can be aggregated and normalized (616). For example, the site security server 224 can aggregate and normalize the information from each of the controller devices 250a and 252a, for example, by collecting information from different sources and organizing the information.

The information can be provided to the user (618). For example, the site security server 224 can provide the aggregated and normalized information to the management server 214 for presentation to the requesting user through the interface device 212.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
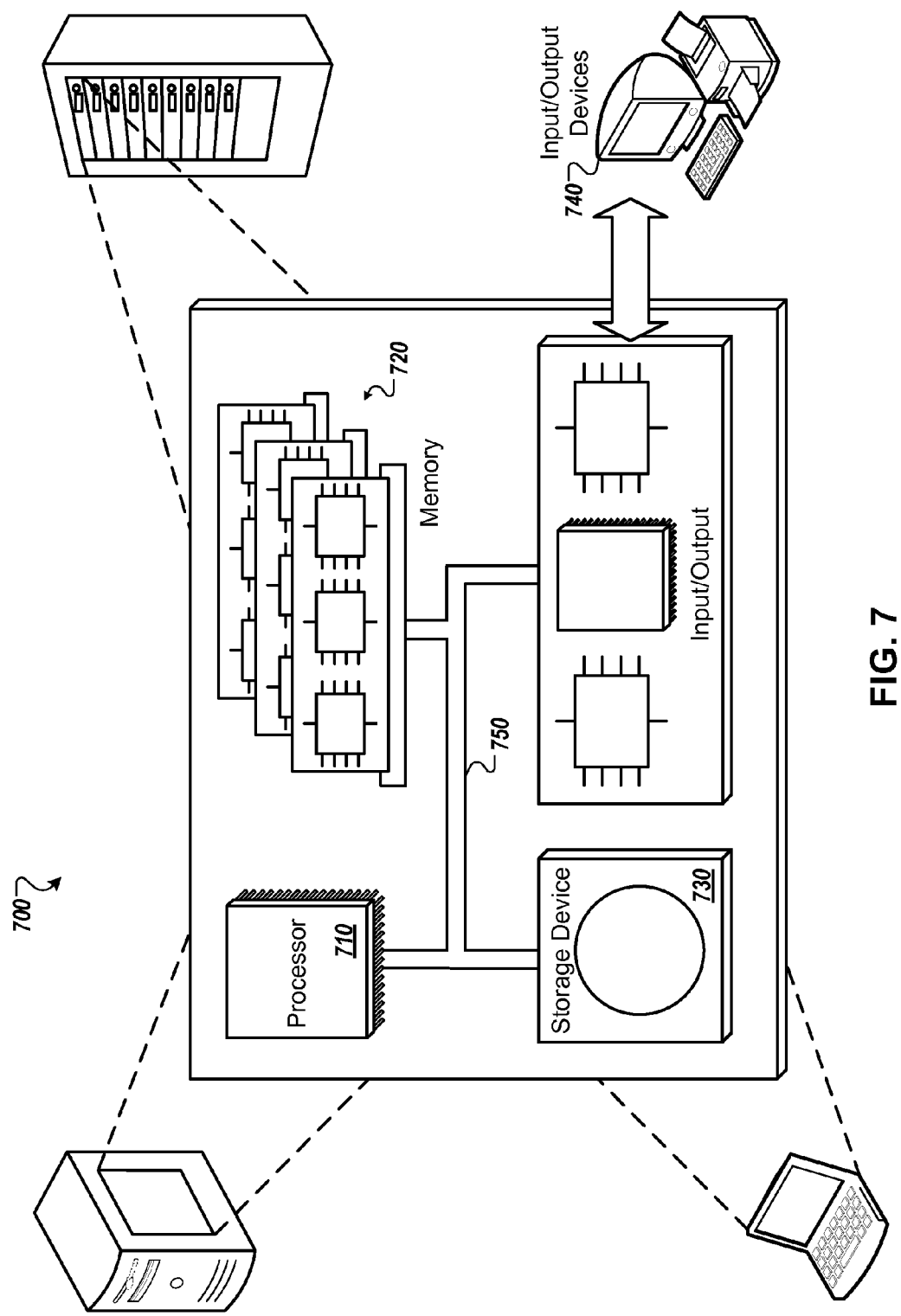
FIG. 7 is a block diagram of a computing system that can be used in connection with computer-implemented methods described in this document.

An example of one such type of computer is shown in FIG. 7, which shows a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
an industrial control network;
two or more controller devices, each controller device operable to control one or more operational devices connected to the industrial control network;
two or more emulators, each emulator configured to communicate with a respective controller device, and each emulator configured to reference a respective profile that includes information about security capabilities of the respective controller device; and
an encryption relay processor operable to implement each emulator and to facilitate communication to and from each emulator over the industrial control network, the encryption relay processor configured to:
(i) execute a cryptographic function for a first communication between a first emulator and a first node on the industrial control network for a first controller device that is incapable of performing the cryptographic function; and (ii) not execute a cryptographic function for a second communication between a second emulator and a second node on the industrial control network for a second controller device that is capable of performing the cryptographic function.

2. The system of claim 1, further comprising a security server operable to maintain the respective profile for the respective controller device and to implement, for each emulator implemented by the encryption relay processor, a corresponding instance of the emulator.

3. The system of claim 2, wherein the security server is operable to reference specification information for the respective controller device and to generate the profile based on the specification information.

4. The system of claim 2, wherein the security server is operable to create the emulator based on its respective profile.

5. The system of claim 2, wherein the security server and the encryption relay processor are each operable to maintain a list of controller devices that are incapable of performing the cryptographic function.

6. The system of claim 2, wherein the security server and the encryption relay processor are each operable to maintain a shared encryption key and to perform key negotiation protocols, and wherein the communication is encrypted or decrypted using the shared encryption key.

7. The system of claim 1, further comprising a firewall between the two or more emulators and the encryption relay processor.

8. The system of claim 1, wherein each emulator is a virtual security entity that is implemented by one or more software components executed by the encryption relay processor.

9. A computer-implemented method for facilitating communication in an industrial control network, the method being executed by one or more processors and comprising:
receiving, from a site security server, an encrypted first query for a first controller device;
after determining that the first controller device is incapable of performing a cryptographic operation, decrypting the first query for the first controller device and providing the decrypted first query to the first controller device;
in response to receiving an unencrypted first query response from the first controller device, encrypting the first query response and providing the encrypted first query response to the site security server;
receiving, from the site security server, an encrypted second query for a second controller device;
after determining that the second controller device is capable of performing a cryptographic operation, providing the received encrypted second query to the second controller device; and
in response to receiving an encrypted second query response from the second controller device, providing the encrypted second query response to the site security server.

10. The computer-implemented method of claim 9, further comprising referencing specification information for the first controller device and generating a profile for the first controller device that includes information about its security capabilities, based on the specification information.

11. The computer-implemented method of claim 10, further comprising creating an emulator for the first controller device based on the profile for the first controller device, wherein the emulator handles cryptographic operations for its corresponding controller device.

12. The computer-implemented method of claim 10, wherein determining that the first controller device is incapable of performing the cryptographic operation includes referencing the profile for the first controller device.

13. The computer-implemented method of claim 9, further comprising maintaining a list of controller devices that are incapable of performing the cryptographic operation, wherein determining that the first controller device is incapable of performing the cryptographic operation and determining that the second controller device is capable of performing the cryptographic operation includes referencing the list.

14. The computer-implemented method of claim 9, wherein the encrypted first query for the first controller device and the encrypted second query for the second controller device are received from the site security server through a firewall, and the encrypted first query response and the encrypted second query response are provided to the site security server through the firewall.

15. A non-transitory computer-readable storage medium coupled to one or more processors and having instructions stored thereon which, when executed by the one or more processors, cause the one or more processors to perform operations for facilitating communication in an industrial control network, the operations comprising:
receiving, from a site security server, an encrypted first query for a first controller device;
after determining that the first controller device is incapable of performing a cryptographic operation, decrypting the first query for the first controller device and providing the decrypted first query to the first controller device;
in response to receiving an unencrypted first query response from the first controller device, encrypting the first query response and providing the encrypted query response to the site security server;
receiving, from the site security server, an encrypted second query for a second controller device;
after determining that the second controller device is capable of performing a cryptographic operation, providing the received encrypted second query to the second controller device; and
in response to receiving an encrypted second query response from the second controller device, providing the encrypted second query response to the site security server.

16. The non-transitory computer-readable storage medium of claim 15, the operations further comprising referencing specification information for the first controller device and generating a profile for the first controller device that includes information about its security capabilities, based on the specification information.

17. The non-transitory computer-readable storage medium of claim 16, the operations further comprising creating an emulator for the first controller device based on the profile for the first controller device, wherein the emulator handles cryptographic operations for its corresponding controller device.

18. The non-transitory computer-readable storage medium of claim 16, wherein determining that the first controller device is incapable of performing the cryptographic operation includes referencing the profile for the first controller device.

19. The non-transitory computer-readable storage medium of claim 15, the operations further comprising maintaining a list of controller devices that are incapable of performing the cryptographic operation, wherein determining that the first controller device is incapable of performing the cryptographic operation and determining that the second controller device is capable of performing the cryptographic operation includes referencing the list.

20. The non-transitory computer-readable storage medium of claim 15, wherein the encrypted first query for the first controller device and the encrypted second query for the second controller device are received from the site security server through a firewall, and the encrypted first query response and the encrypted second query response are provided to the site security server through the firewall.

\* \* \* \* \*